US010036218B2

(12) United States Patent
Oy (10) Patent No.: US 10,036,218 B2
(45) Date of Patent: Jul. 31, 2018

(54) REGULATING DRILLING FLUID PRESSURE IN A DRILLING FLUID CIRCULATION SYSTEM (71) Applicant: Halliburton Energy Services, Inc., Houston, TX (US)

(72) Inventor: Lars Oy, Stavanger (NO)

(73) Assignee: Halliburton Energy Services, Inc., Houston, TX (US)

( * ) Notice: Subject to any disclaimer, the term of this patent is extended or adjusted under 35 U.S.C. 154(b) by 275 days.

(21) Appl. No.: 14/429,309

(22) PCT Filed: Dec. 31, 2012

(86) PCT No.: PCT/IB2012/057842
§ 371 (c)(1),
(2) Date: Mar. 18, 2015

(87) PCT Pub. No.: WO2014/102573
PCT Pub. Date: Jul. 3, 2014

(65) Prior Publication Data
US 2015/0233197 A1 Aug. 20, 2015

(51) Int. Cl.
*E21B 21/08* (2006.01)
*E21B 21/10* (2006.01)
*G05B 15/02* (2006.01)

(52) U.S. Cl.
CPC ............ *E21B 21/08* (2013.01); *E21B 21/106* (2013.01); *G05B 15/02* (2013.01)

(58) Field of Classification Search
CPC ........ E21B 21/08; E21B 21/106; G05B 15/02
See application file for complete search history.

(56) References Cited

U.S. PATENT DOCUMENTS 3,338,319 A  8/1967  Griffin, III
3,552,502 A  1/1971  Wilson, Sr.
(Continued)

FOREIGN PATENT DOCUMENTS

RU  2520201 C1  6/2014
SU  1388539 A1  4/1988

OTHER PUBLICATIONS

International Search Report and Written Opinion of the International Searching Authority issued in International Application No. PCT/US2013/031003 dated Nov. 11, 2013 11 pages.
(Continued)

*Primary Examiner* — Thomas C Lee
*Assistant Examiner* — Tri T Nguyen
(74) *Attorney, Agent, or Firm* — Alan Bryson; Parker Justiss, P.C.

(57) ABSTRACT

A system and method are disclosed for regulating drilling fluid pressure in a drilling fluid circulation system. In one embodiment, a drilling fluid circulation system includes a processor (110) connected to a pressure relief device (104), which is connected to piping between a discharge of a drilling fluid pump (30) and an inlet of a drill string (31). The processor receives pressure measurement signals representative of a pressure of the drilling fluid in the piping and flow parameter signals representative of a flow of the drilling fluid through the piping. From the pressure measurement signals and the flow parameter signals, the processor determines that a target pressure parameter of the drilling fluid in the piping is not satisfied. In response, the processor lowers the pressure of the drilling fluid in the piping until the target pressure parameter is satisfied by at least partially opening the pressure relief device.

20 Claims, 5 Drawing Sheets

(56) References Cited

U.S. PATENT DOCUMENTS

| | | |
|---|---|---|
| 6,484,816 B1 | 11/2002 | Koederitz |
| 6,755,261 B2 | 6/2004 | Koederitz |
| RE38,567 E | 8/2004 | Gruenhagen |
| 6,904,981 B2 | 6/2005 | Van Riet |
| 6,920,085 B2 | 7/2005 | Finke et al. |
| 7,086,486 B2* | 8/2006 | Ravensbergen .......... E21B 4/02 |
| | | 175/107 |
| 7,546,929 B2* | 6/2009 | Wierzba .................. B66C 11/04 |
| | | 212/326 |
| 8,042,572 B2 | 10/2011 | Winnacker et al. |
| 8,281,875 B2 | 10/2012 | Lovorn et al. |
| 8,844,633 B2 | 9/2014 | Reitsma et al. |
| 9,388,650 B2* | 7/2016 | Leuchtenberg ......... E21B 21/08 |
| 2001/0027775 A1* | 10/2001 | Sakai .................. F02D 41/2464 |
| | | 123/457 |
| 2001/0050186 A1 | 12/2001 | Wilson et al. |
| 2003/0196804 A1 | 10/2003 | Riet |
| 2005/0092523 A1 | 5/2005 | McCaskill et al. |
| 2007/0151763 A1 | 7/2007 | Reitsma et al. |
| 2008/0078586 A1 | 4/2008 | Tettleton et al. |
| 2008/0093070 A1* | 4/2008 | Buyers .................... E21B 47/06 |
| | | 166/250.15 |
| 2008/0295589 A1 | 12/2008 | Cour |
| 2009/0194330 A1 | 8/2009 | Gray |
| 2009/0272580 A1 | 11/2009 | Dolman et al. |
| 2010/0133009 A1* | 6/2010 | Carlson .................. E21B 44/06 |
| | | 175/45 |
| 2011/0139506 A1 | 6/2011 | Lovorn et al. |
| 2011/0139509 A1* | 6/2011 | Pool ........................ E21B 21/08 |
| | | 175/50 |
| 2012/0048620 A1 | 3/2012 | Hopwood et al. |
| 2012/0228027 A1* | 9/2012 | Sehsah .................. E21B 49/008 |
| | | 175/48 |
| 2012/0285744 A1 | 11/2012 | Bernard |
| 2014/0345941 A1* | 11/2014 | Sutter .................... E21B 34/16 |
| | | 175/25 |

OTHER PUBLICATIONS

International Search Report and Written Opinion of the International Searching Authority issued in in International Application No. PCT/IB2012/057842 dated Sep. 26, 2013, 11 pages.
Cayeux et al., "Automation of Mud-Pump Management: Application to Drilling Operations in the North Sea," International Research Institute of Stavanger, SPE Drilling & Completion, vol. 26.1, Mar. 2011, pp. 41-51.
Patent Examination Report No. 1, Australian Application No. 2012398043, dated Dec. 1, 2015, 3 pages.
PCT International Preliminary Report on Patentability, PCT/IB2012/057842, dated Jul. 9, 2015, 6 pages.
Candian Office Action issued in Canadian Application No. 2,885,260, dated Mar. 14, 2016.

* cited by examiner

REGULATING DRILLING FLUID PRESSURE IN A DRILLING FLUID CIRCULATION SYSTEM

CLAIM OF PRIORITY

This application is a U.S. National Stage of PCT/IB2012/057842 filed on Dec. 31, 2012.

TECHNICAL FIELD

This disclosure relates to circulating drilling fluid through wellbores.

BACKGROUND

Figure 1:
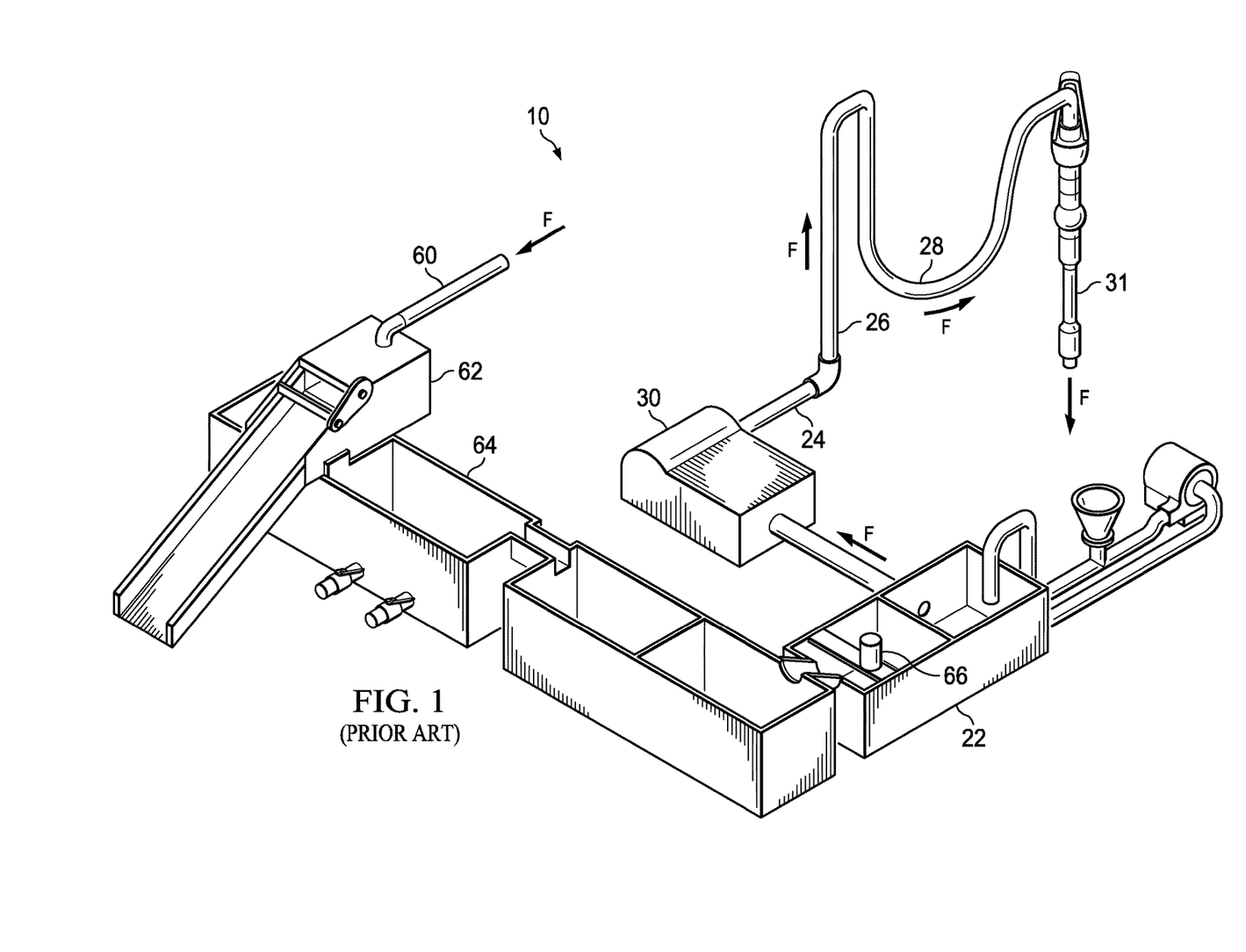
FIG. 1 is an example of a prior art drilling fluid circulation system.
Figure 2:
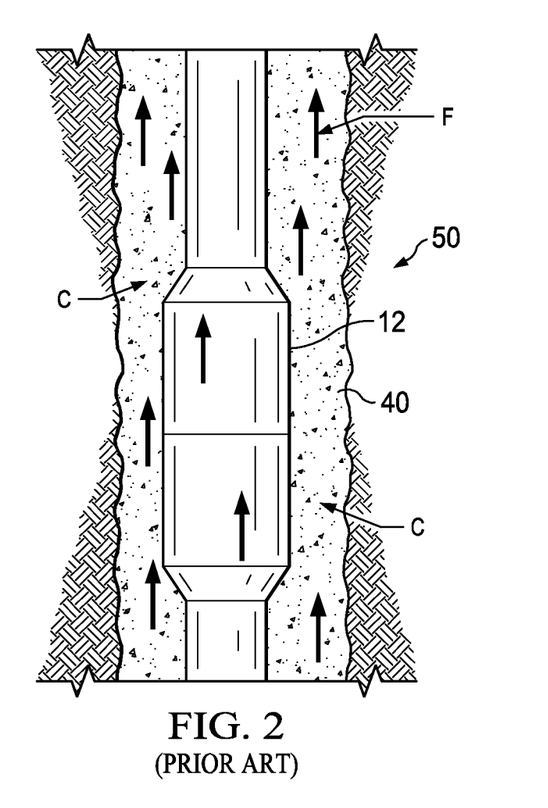
FIG. 2 is an example of drilling mud flowing through a drill string and an annulus between the drill string and a wellbore.

In wellbore drilling situations that use a drilling rig, a drilling fluid circulation system circulates (or pumps) drilling fluid (for example, drilling mud) with one or more mud pumps. As illustrated in prior art FIGS. 1 and 2, the drilling fluid circulation system 10 moves drilling mud (fluid, F) down into the wellbore 50 through special pipe referred to in the art as drill pipe 12, and drill collars which are connected to the drill sting. The fluid exits through ports (jets) in the drill bit, picking up cuttings C and carrying the cuttings up the annulus 40 of the wellbore 50 (FIG. 2). Referring again to FIG. 1, the mud pump 30 takes suction from mud tanks 22 and pumps mud F out discharge piping 24, up the stand pipe 26, through rotary hoses 28, through Kelly or top drive unit 31, and into a central bore of the drill pipe 12, drill collars, and bit. Mud F and cuttings C return to the surface up annulus 40 (FIG. 2). At the surface, the mud and cuttings leave the wellbore through an outlet (not shown), and are sent to a cuttings removal system via mud return line 60. At the end of the return lines, mud F and cutting C are flowed onto a vibrating screen known in the art as a Shale Shaker 62. Finer solids may be removed by a sand trap 64. The mud may be treated with chemicals stored in a chemical tank 66 and then provided into the mud tank 22, where the process is repeated.

The drilling fluid circulation system delivers large volumes of mud flow under pressure for drilling rig operations. The circulation system delivers the mud to the drill stem to flow down the string of drill pipe and out through the drill bit appended to the lower end of the drill stem. In addition to cooling the drill bit, the mud hydraulically washes away the face of the wellbore through a set of openings in the drill bit. The mud additionally washes away debris, rock chips, and cuttings, which are generated as the drill bit advances. The circulation system flows the mud in an annular space on the outside of the drill stem and on the interior of the open hole formed by the drilling process. In this manner, the circulation system flows the mud through the drill bit and out of the wellbore.

The mud flows through the drill stem and the annular space at a sufficient velocity to move debris, chips and cuttings, which are heavier than the mud, to the surface. The velocity of the mud should also be sufficient to cool the drill bit. The wellhead pressures at the pump are sufficiently high to flow the mud at the desired velocity and also to overcome substantial flow pressure resistance along the flow path. In some situations, the circulation system can flow the mud through the drill bit and the wellbore at high volumetric flow rates (for example, 500 to 1,000 gallons per minute) and at pressures as high as 5,000 PSI. The circumstances under which the drilling rig is used can cause the drill string to experience a pack off, for example, when the cuttings or debris (or both) clog the flow path of the drilling mud in the annulus between the borehole and the drill string, drill collars, or drill bit, or combinations of them. Consequently, a downhole pressure can rapidly increase resulting in fracture of one or more downhole formations and possibly even loss of the wellbore.

DESCRIPTION OF DRAWINGS

Like reference numbers and designations in the various drawings indicate like elements.

DETAILED DESCRIPTION

This disclosure describes a system and method for regulating drilling fluid pressure in a drilling fluid circulation system. The circulation system can include a drilling rig stand pipe, which can be, for example, a metal conduit that is part of the piping system mud pump discharge pressure pathway for the drilling fluid (for example, drilling mud) to travel to the drill bit attached to a downhole end of a drill string. If a downhole pack off occurs, then pressure of the drilling fluid in the drilling rig stand pipe can increase rapidly resulting in a fracture of one or more downhole formations. When a downhole formation is fractured, drilling fluid may be lost into the formation reducing the column of drilling fluid which reduces the hydrostatic pressure at points in the wellbore. Sudden loss of drilling fluid may result in loss of control of the well and result in a blowout and possible loss of the wellbore. The computer systems and the computer-implemented methods described in this disclosure can be implemented to automatically reduce the pressure of the drilling fluid in the drilling rig stand pipe when an increase in a pressure parameter of the fluid in the stand pipe is sensed. In some implementations, the drilling fluid circulation system can be connected to a computer-controlled pressure relief device, which can automatically reduce the pressure of the drilling fluid in the drilling rig standpipe in response to receiving instructions from a computer system connected to the circulation system.

Implementing the techniques described in this disclosure can provide one or more of the following potential advantages. In general, the techniques described here can be implemented to automatically reduce pressure in a drilling rig standpipe, particularly when pack offs occur. Doing so can save a downhole formation from harmful over pressure causing undesirable fracturing. Moreover, reducing pressure when pack offs occur can prevent the rupture disc on the mud pump from rupture. Reducing pressure can also prevent either mud motor stall out or top drive still out or both.

Avoiding the pressure peaks on the surface mud system and bottom hole assembly can reduce wear on all surface equipment like mud pumps, wash pipes, and the like, and down hole assembly like rotary steerable, monitoring while drilling (MWD) tools and pressure activated equipment like hydraulic activated whipstocks and hydraulic activated reamers. Relative to manual methods of shutting down mud pumps included in the circulation system during pack offs, the techniques described here can be faster and more efficient. In addition, providing computer instructions to control the pressure relief device can decrease a physical effort required to manually shut down the mud pumps. The techniques described here can also be faster and more efficient relative to manual methods of controlling pressure relief devices connected to the drilling rig standpipe.

Figure 3:
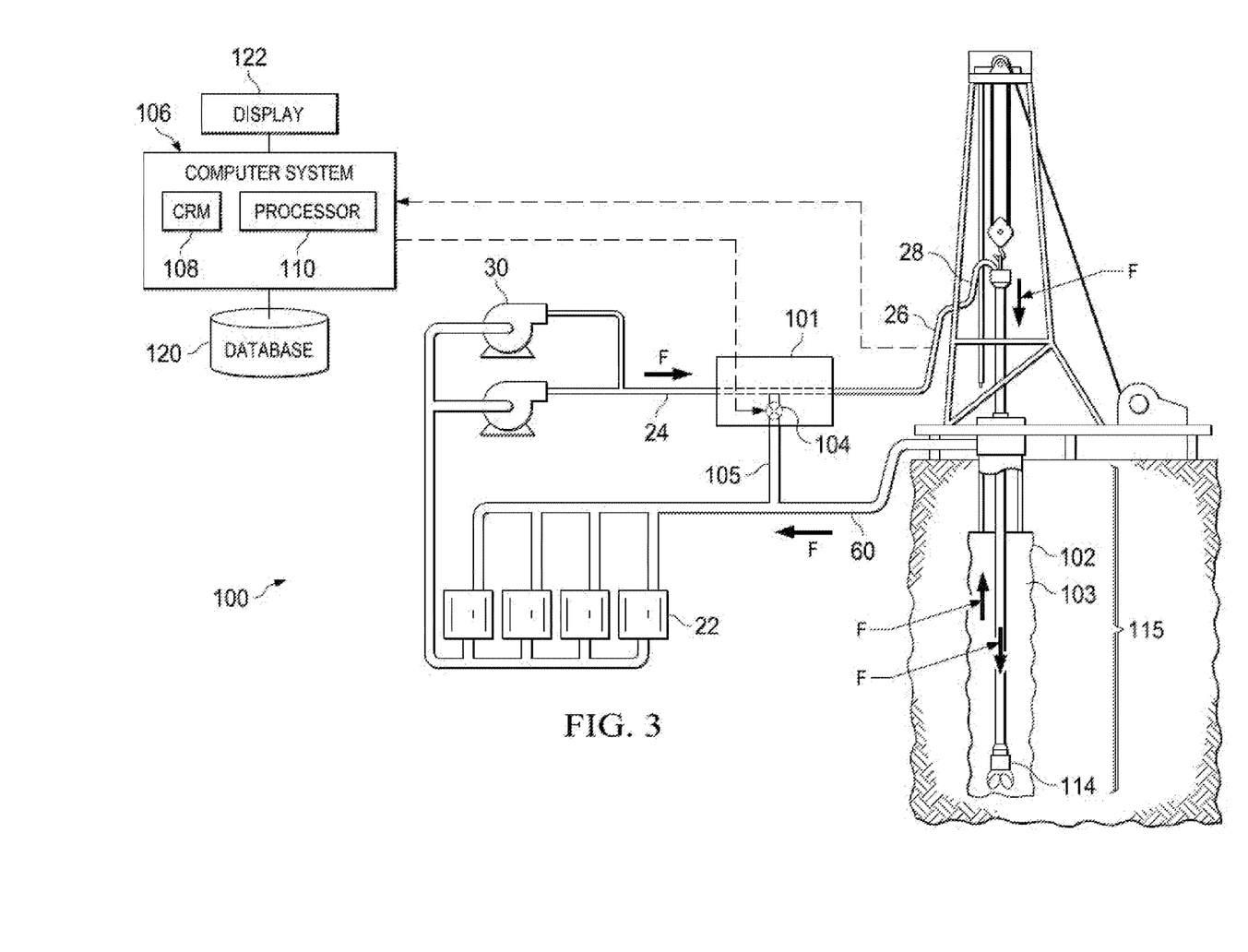
FIG. 3 is an example of a drilling fluid circulation system that includes a pressure relief device.

FIG. 3 is an example of a drilling fluid circulation system 100 of the present disclosure that includes a pressure relief device 104. In some implementations, the pressure relief device 104 can be connected to the piping 24 between discharge of the drilling fluid pump 30 and inlet of the drill string 115. For example, an inlet to the pressure relief device 104 can be connected to the piping 24. An outlet to the pressure relief device 104 can be connected to the mud return line 60, for example, via piping 105. The drilling fluid circulation system 100 and the pressure relief device 104 can be connected to a computer system 106 disposed at the surface to regulate drilling fluid pressure in the drilling fluid circulation system 100 by automatically operating the pressure relief device 104. A wellbore 102 can be drilled in the ground using a drill bit 114 attached to a downhole end of a drill string 115 connected to piping 24 from the discharge of the mud pump to the Kelly or top drive system 30. The piping 24 can include a drilling rig standpipe 26. The drilling fluid circulation system 100 can include one or more pumps 30, tanks 22, and solids separation devices (FIG. 1). The mud pump drives (i.e., pumps) drilling fluid F (for example, drilling mud) through the piping 24 including the drilling rig standpipe 26, then downhole through the drill string 115, into and out of the drill bit 114, and uphole through the annulus 103 between the drill string 115 and the inner wall of the wellbore 102.

The computer system 106 (for example, a desktop computer, a laptop computer, a tablet computer, a computer server system, and the like) can include a computer-readable medium 108 storing computer instructions executable by a processor 110 to regulate the drilling fluid pressure in the drilling fluid circulation system 100. In some implementations, the computer system 106 can receive pressure measurement signals representative of a pressure of the drilling fluid in the piping 24. The computer system 106 can receive flow parameter signals representative of a flow of the drilling fluid through the piping 24. The computer system 106 can determine, from the pressure measurement signals and the flow parameter signals, that a target pressure parameter of the drilling fluid in the piping 24 is not satisfied. In response to determining that the target pressure parameter is not satisfied, the computer system 106 can lower the pressure of the drilling fluid in the piping 24 until the target pressure parameter is satisfied by at least partially opening the pressure relief device 104.

As used herein, the drilling rig standpipe 26 is intended to encompass any of the piping 24 from the discharge of the mud pump to the Kelly or top drive system 30 attached to the drill string 115, and can include any portion of the piping between the discharge and Kelly or top drive system 30. Therefore, it will be understood that the terms standpipe pressure and standpipe flow rate could be measured anywhere along the piping between the discharge of the mud pump 30 and the Kelly/top drive 31. The flow rate in piping 24 may alternatively or additionally be determined based on known flow rate methods for calculation of the output flow of mud pump 36 based on speed and cylinder displacement for a positive displacement mud pump.

As described below, the computer system 106 can receive a target pressure parameter that represents a beginning of a pack off from an operator of the drilling rig. For example, the computer system 106 can display a user interface in a display device 122 connected to the computer system 106. The operator of the drilling rig can provide the target pressure parameter. The target pressure parameter can be a fixed pressure measured in the drilling rig standpipe 26. Alternatively, or in addition, the target pressure parameter can be a rate of change (for example, increase or decrease) of pressure in the drilling rig standpipe 26 based on a trend of drilling fluid pressure over time. In some implementations, the computer system 106 can receive updated target pressure parameter over the course of drilling operations. For example, target pressure parameters for different drilling conditions (for example, different drilling depths, different bit constructions, different wells, and other conditions) can be different. In some implementations, the operator of the drilling rig can manually update the target pressure parameter according to drilling conditions at different time instants. Alternatively, or in addition, the target pressure parameter can be automatically updated. For example, the computer system 106 can implement a computer-executable algorithm to increase the target pressure parameter by a fixed (or variable) factor, such as 10%, at specified time intervals, such as daily. In another example, the computer system 106 can implement a computer-executable algorithm that can determine a revised target pressure parameter based on an existing target pressure parameter and changes in the drilling conditions.

During drilling operation, the computer system 106 can periodically log pressure in the piping 24, and store the logged pressure, for example, in a database 120 included in or connected to the computer system 106. From the logged pressure, the computer system 106 can periodically determine the pressure parameter. When the computer system 106 determines that the determined pressure parameter exceeds the target pressure parameter received from the operator, then the computer system 106 can partially open the pressure relief device 104 resulting in flow of the drilling fluid being returned to a fluid reservoir (for example, mud tanks 22/pits). When the flow is diverted, the pressure in the piping 24 will decrease, thereby preventing or decreasing the chances of fracture in the downhole formation due to the pack off. The operator can shut down the mud pumps included in the drilling fluid circulation system 100 until the pressure parameter decreases to below the target pressure parameter.

Figure 4:
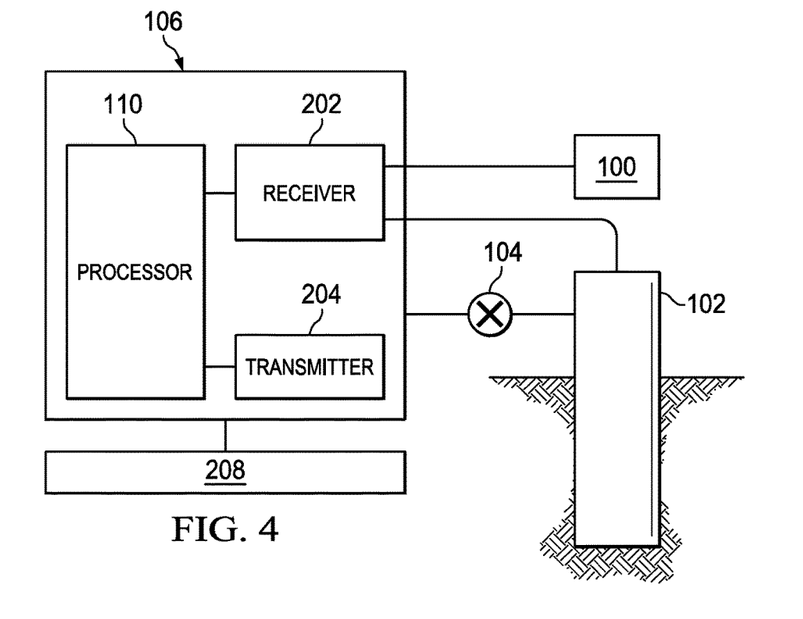
FIG. 4 is an example of a computer system to regulate drilling fluid pressure in the drilling fluid circulation system.

FIG. 4 is an example of a computer system 106 to regulate drilling fluid pressure in the drilling fluid circulation system 100. The computer system 106 can include a receiver 202 connected to the drilling fluid circulation system 100 and the wellbore 102 (specifically, for example, the piping 24) to receive pressure measurement signals and flow measurement signals that represent the pressure of the drilling fluid in the piping 24 and the flow through the piping 24, respectively. The computer system 106 can store (for example, on the computer-readable medium 108) instructions executable by the processor 110 to determine, from the pressure measurement signals and the flow parameter signals, that the target pressure parameter of the drilling fluid in the piping 24 is not satisfied.

The pressure measurement signals and the flow measurement signals can be received, in some implementations, from one or more instruments disposed either in the drilling fluid circulation system 100 or in the wellbore 102 (or both). In some implementations, multiple instruments can be disposed at respective multiple locations along the drilling fluid circulation system 100. For example, an instrument can be attached to the drill string at or near the drill bit. Alternatively, or in addition, the instruments can be attached on the high pressure side of the drilling circulation system such as anywhere from a discharge of the pump 30 to the portion of the piping 24 where the drilling fluid enters the drill string 115. In some implementations, one or more of the instruments can be attached near the drilling rig standpipe 26 to measure pressure which can be most representative of pressure in the drill string 115. Among other data, the instruments can measure (for example, at the respective locations to which the instruments are attached) pressure of the drilling fluid in the drilling fluid circulation system 100, for example, in the drilling rig standpipe 26. For example, multiple instruments can be attached to multiple locations along the piping 24, the drill bit 114, the drill string 115, the drilling rig standpipe 26, the wellbore 102, or combinations of them to periodically measure a pressure of the drilling fluid F circulated by the drilling fluid circulation system 100. The measured pressure can be periodically transmitted to the receiver 202, for example, in real time. Transmitting the measured pressure in real time means that the instrument that measures a pressure, generates and transmits a signal representing the pressure as quickly as possible after measuring the pressure. In other words, negligible time lapses between the measurement of the pressure and transmission of the signal representing the pressure.

In some implementations, the computer system 106 can implement rapid digital logging of the drilling fluid pressure in the piping 24 using the drilling optimization software. The computer system 106 can additionally implement InSite Anywhere® Direct Service computer software (provided by Halliburton Energy Services of Houston, Tex.) to log the drilling fluid pressure in real time. In some implementations, the computer system 106 can display the logged pressure data, for example, as pressure v/s time plots, on the display device 122.

The one or more instruments disposed either in the drilling fluid circulation system 100 or in the wellbore 102 (or both) can additionally measure flow parameters of the drilling fluid circulated by the drilling fluid circulation system 100. The flow parameters can include a volumetric flow rate (for example, an input flow rate of the drilling fluid into the drill string and the drilling rig standpipe 26). The instruments can additionally measure parameters such as weight on bit, which can affect drilling fluid pressure in the drilling rig standpipe 26 and drill string 115 when downhole mud motors are used for drilling. In addition, each instrument that is attached at a respective location along the piping 24 can transmit the respective location to the receiver 202. All parameters can be measured and transmitted to the receiver 202 in real time. In some implementations, the pressure and flow data can be measured using other devices, either alone or in combination with one or more of the instruments. For example, pump strokes of the positive displacement mud pumps can be used to calculate flow rate of the fluid.

The computer system 106 can receive the flow parameters and additional parameters measured by the instruments periodically and in real time. To determine the target pressure parameter, the computer system 106 can determine an effective pressure of the drilling fluid in the piping 24 from the pressure represented by the pressure measurement signals and flow pressure represented by the flow parameter signals. In some implementations, the computer system 106 can assign an equal weight to all the parameters measured by the instruments. Alternatively, or in addition, the computer system 106 can assign different weights to different parameters when determining the effective pressure of the drilling fluid in the piping 24. The target pressure parameter can be a fixed pressure of the drilling fluid or a rate of increase in pressure of the drilling fluid. The computer system 106 can enable the operator of the drilling rig to select either a fixed pressure or a rate of increase in pressure (or both) as a target pressure parameter, and provide the selected target pressure parameter into the user interface, as described above.

In implementations in which the target pressure parameter is a fixed pressure, the computer system 106 can determine an effective pressure of the drilling fluid in piping 24 at various time instants during drilling operations. The computer system 106 can determine if the effective pressure is greater than the fixed pressure at any of the various time instants. For example, the computer system 106 can determine that a flow pressure into the piping 24 is increasing over time because a flow rate into the piping 24 is increasing over time. The computer system 106 can additionally determine that the drilling fluid pressure at the downhole end of the drill string is stable. In response, the computer system 106 can determine that an increase in the drilling fluid pressure is not due to a pack off but rather due to an increase in a volumetric flow rate of the drilling fluid into the piping 24. If, on the other hand, the computer system 106 determines flow pressure due to the input flow rate into the piping 24 is stable (i.e., substantially constant over time) and yet the pressure in the piping 24 is increasing over time, then the computer system 106 can determine that an effective pressure is greater than the fixed pressure due to a pack off.

In implementations in which the target pressure parameter is a rate of increase in pressure, the computer system 106 can determine an effective rate of increase in pressure of the drilling fluid in the piping 24 at various time instants. For example, from the pressure measurement signals and the flow parameter signals, the computer system 106 can determine a slope of the pressure of the drilling fluid at the various time instants. If the slope exceeds the target rate of increase in pressure, then the computer system 106 can determine that the effective rate of increase in pressure is greater than the rate of increase in pressure.

The computer system 106 can also include a transmitter 204 to transmit control signals to at least partially open or at least partially close (or both) a pressure relief device. In some implementations, the pressure relief device can be a diverter valve 104 in a Geo-Span® downlink skid 101 (provided by Halliburton Energy Services, Sperry Drilling Services, of Houston, Tex.). For example, the processor 110 can cause the transmitter 204 to transmit control signals to the downlink skid to at least partially open the diverter valve 104 in response to determining that the target pressure parameter is not satisfied. In some implementations, the diverter valve 104 can be sized to decrease the pressure of the drilling fluid in the drilling rig standpipe 26 by diverting the drilling fluid out of the drilling rig standpipe 26. The diverter valve 104 can be sized to decrease the pressure of the drilling fluid in the drilling rig standpipe 26 by several percentages, for example, approximately 30% to 50%.

The processor 110 can additionally cause the transmitter 204 to transmit a notification signal to turn off a mud pump disposed in the drilling fluid circulation system 100 at the surface. In some implementations, a notification system 208, which is connected to the computer system 106, can receive the notification signal from the transmitter 204. In some implementations, the notification system 208 can include an alarm, which can be positioned near the drilling rig operator and can produce a sound upon receiving the notification signal from the transmitter 204. Alternatively, or in addition, the notification system 208 can include any combination of devices that can alert the drilling rig operator to shut down the pumps in the drilling fluid circulation system 100. For example, the notification system 208 can include lights that can flash upon receiving the notification signal. In some implementations, the notification system 208 can include a computer system that executes a computer software application to transmit electronic notifications (for example, electronic mail alerts) to electronic devices (for example, smartphones, tablet computers, or the like) controlled by the drilling rig operator to notify the operator that the target pressure parameter has been exceeded.

As the diverter valve 104 diverts the drilling fluid from the piping 24, the pressure of the drilling fluid in the piping 24 and the drill string 115 will decrease. The computer system 106 continues to periodically log the pressure of the drilling fluid in the piping 24 and to determine the pressure parameter. When the computer system 106 determines, from the pressure measurement signals and the flow parameter signals, that a pressure of the drilling fluid in the piping 24 satisfies the target pressure parameter, the computer system 106 can transmit an instruction to close the diverter valve 104. For example, the computer system 106 can cause the transmitter 204 to transmit a notification signal to close the diverter valve 104. In addition, the computer system 106 can request the drilling rig operator to reset the target pressure parameter.

Figure 5:
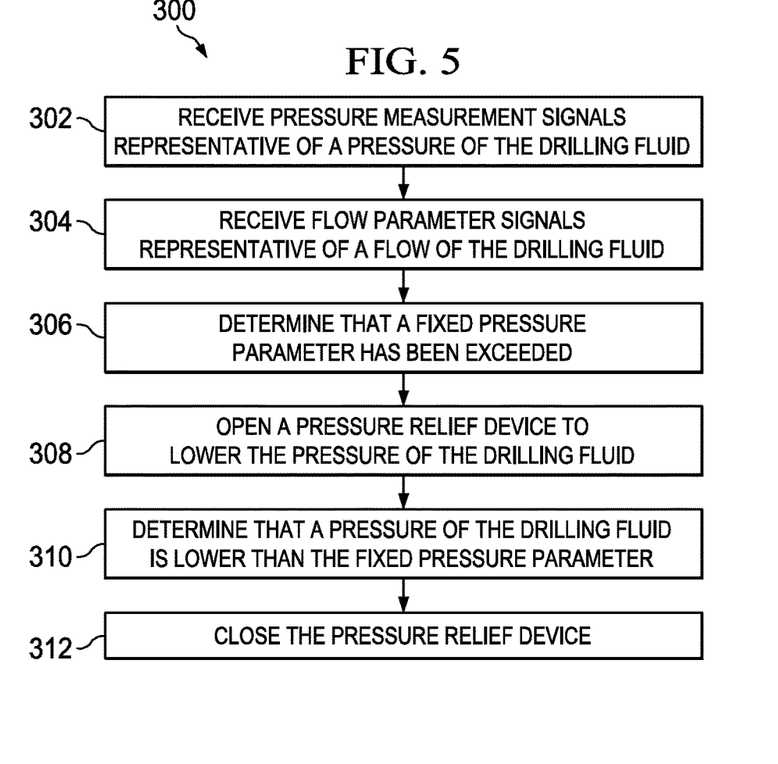
FIG. 5 is a flowchart of a first example process of regulating drilling fluid pressure in the drilling fluid circulation system.

FIG. 5 is a flowchart of a first example process 300 of regulating drilling fluid pressure in the drilling fluid circulation system. The process 300 can be implemented as computer-readable instructions stored on a computer-readable medium (for example, a non-transitory computer-readable medium) and executed by one or more data processing apparatus (for example, a processor). For example, the process 300 can be implemented by the computer system 106. At 302, the computer system 106 receives pressure measurement signals representative of a pressure of the drilling fluid. At 304, the computer system 106 receives flow parameter signals representative of a flow of the drilling fluid. At 306, the computer system 106 determines that a fixed pressure parameter has been exceeded. For example, the computer system 106 determines that a fixed value of drilling fluid pressure in piping 24 has been exceeded. In response, at 308, the computer system 106 opens a pressure relief device to lower the pressure of the drilling fluid. At 310, the computer system 106 determines that a pressure of the drilling fluid is lower than the fixed pressure parameter. In response, at 312, the computer system 106 closes the pressure relief device.

Figure 6:
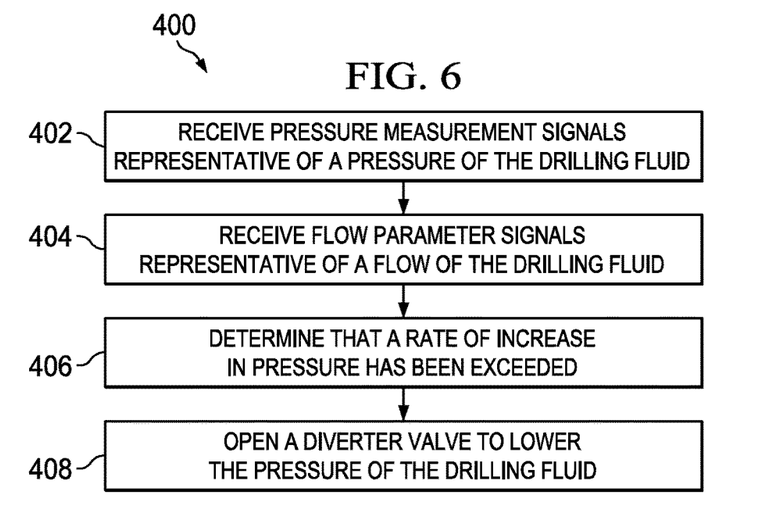
FIG. 6 is a flowchart of a second example process of regulating drilling fluid pressure in the drilling fluid circulation system.

FIG. 6 is a flowchart of a second example process 400 of regulating drilling fluid pressure in the drilling fluid circulation system. The process 400 can be implemented as computer-readable instructions stored on a computer-readable medium (for example, a non-transitory computer-readable medium) and executed by one or more data processing apparatus (for example, a processor). For example, the process 400 can be implemented by the computer system 106. At 402, the computer system 106 receives pressure measurement signals representative of a pressure of a drilling fluid in the piping (for example, the drilling rig standpipe) included in the drilling fluid circulation system. At 404, the computer system 106 receives flow parameter signals representative of a flow of the drilling fluid through the piping. At 406, the computer system 106 determines, from the pressure measurement signals and the flow parameter signals, that a target pressure parameter (for example, a rate of increase in drilling fluid pressure) is not satisfied (for example, has been exceeded). In response to determining that the target pressure parameter is not satisfied, at 408, the computer system 106 causes a pressure relief device connected to the drilling fluid circulation system to be at least partially opened to relieve the pressure of the drilling fluid in the drilling rig standpipe until the target pressure parameter is satisfied. For example, the computer system 106 opens a diverter valve to lower the pressure of the drilling fluid.

Figure 7:
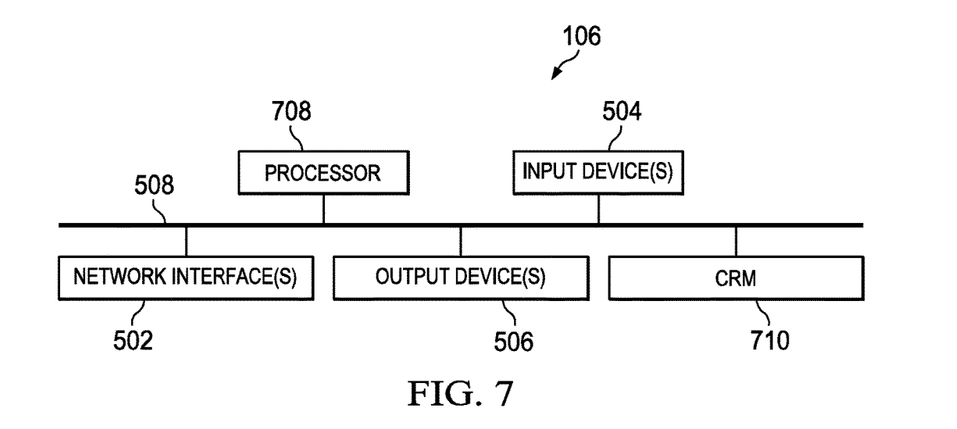
FIG. 7 is an example of an architecture of the computer system of FIG. 1.

FIG. 7 is an example of an architecture of the computer system 106 of FIG. 3. The computer system includes one or more processors 708 and a computer-readable medium 710 (for example, a non-transitory computer-readable medium) storing computer instructions executable by the one or more processors 708 to transmit well data up hole based on bandwidth. The computer system can include one or more network interfaces 502 and one or more input devices 504. The computer system can also include one or more output devices 506, for example, the display 122, and the like. The components of the computer system can be coupled by a bus 508.

A number of embodiments have been described. Nevertheless, it will be understood that various modifications may be made without departing from the spirit and scope of the invention. In some implementations, downhole pressure-while-drilling (PWD) data can be used to determine the pressure parameter as an alternative to or in addition to pressure in the drilling rig standpipe 26. In addition, the drilling fluid circulation system 100 and the computer system 106 can be implemented as a single system or as separate systems.

What is claimed is:

1. A system for regulating drilling fluid pressure, the system comprising:
   a pressure relief device comprising a diverter valve connected to piping between a discharge of a drilling fluid pump and an inlet of a drill string, the diverter valve sized to decrease the pressure of the drilling fluid in the piping by at least 30% by diverting at least a portion of the drilling fluid out of the piping; and
   a processor connected to the pressure relief device, the processor configured to:
   receive pressure measurement signals representative of a pressure of the drilling fluid in the piping,
   receive flow parameter signals representative of a flow the drilling fluid through the piping,
   determining, from the pressure measurement signals and the flow parameter signals, that a target pressure parameter of the drilling fluid in the piping is not satisfied, and
   in response to determining that the target pressure parameter is not satisfied, lower the pressure of the drilling fluid in the piping until the target pressure parameter is satisfied by at least partially opening the pressure relief device, and further wherein the target pressure parameter is a rate of increase in pressure of the drilling fluid in the piping, and wherein determining that the rate of increase of the drilling fluid is not satisfied comprises:
determining an effective rate of increase in pressure of the drilling fluid in the piping from the pressure represented by the pressure measurement signals and flow pressure represented by the flow parameter signals; and
determining that the effective rate of increase in pressure is greater than the rate of increase in pressure.

2. The system of claim 1, further comprising:
a transmitter in electronic communication with the processor to transmit control signals to at least partially open or at least partially close the pressure relief device, wherein the processor is further configured to cause the transmitter to transmit control signals to at least partially open the pressure relief device in response to determining that the target pressure parameter is not satisfied.

3. The system of claim 2, wherein the processor is further configured to cause the transmitter to transmit a notification signal to turn off a mud pump disposed in a drilling fluid circulation system at the surface.

4. The system of claim 1, further comprising a computer-readable medium storing instructions executable by the processor to determine, from the pressure measurement signals and the flow parameter signals, that the target pressure parameter of the drilling fluid in the piping is not satisfied.

5. The system of claim 1, further including:
determining that a pressure of the drilling fluid in the piping satisfies the target pressure parameter; and
closing the pressure relief device in response to determining that the pressure of the drilling fluid in the piping satisfies the target pressure parameter.

6. The system of claim 1, further comprising a notification system connected to the processor, and further wherein the system transmits a notification signal to the notification system in response to determining that the target pressure parameter is not satisfied.

7. The system of claim 6, wherein the notification system includes an alarm that produces a sound upon receiving the notification signal.

8. The system of claim 6, wherein the piping includes a drilling rig standpipe connected to a Kelly or top drive system attached to the inlet of the drill string.

9. The system of claim 6, further comprising a plurality of instruments attached to the piping and configured to:
generate the pressure measurement signals representative of the pressure of the drilling fluid in the piping; and
transmit the pressure measurement signals to the processor.

10. The system of claim 9, wherein the plurality of instruments are attached to a plurality of respective locations on the piping.

11. The system of claim 6, wherein the pressure of the drilling fluid in the piping is measured near a downhole end of the drill string.

12. A computer-implemented method to regulate drilling fluid pressure in a drilling fluid circulation system, the method comprising:
receiving pressure measurement signals representative of a pressure of a drilling fluid in piping between discharge of a drilling fluid pump included in the drilling fluid circulation system and inlet of a drill string;
receiving flow parameter signals representative of a flow of the drilling fluid through the piping;
determining, from the pressure measurement signals and the flow parameter signals, that a target pressure parameter of the drilling fluid in the piping is not satisfied; and
in response to determining that the target pressure parameter is not satisfied, causing a pressure relief device comprising a diverter valve connected to the drilling fluid circulation system to be at least partially opened to relieve the pressure of the drilling fluid in the piping until the target pressure parameter is satisfied, wherein the target pressure parameter is a rate of increase in pressure of the drilling fluid in the piping, and wherein determining that the rate of increase of the drilling fluid is not satisfied comprises, and further wherein the diverter valve is sized to decrease the pressure of the drilling fluid in the piping by at least 30% by diverting at least a portion of the drilling fluid out of the piping:
determining an effective rate of increase in pressure of the drilling fluid in the piping from the pressure represented by the pressure measurement signals and flow pressure represented by the flow parameter signals; and
determining that the effective rate of increase in pressure is greater than the rate of increase in pressure.

13. The method of claim 12, wherein causing the pressure relief device to be at least partially opened comprises transmitting control signals to at least partially open the pressure relief device.

14. The method of claim 13, further comprising transmitting a notification signal to turn off a mud pump disposed in the drilling fluid circulation system at the surface.

15. The method of claim 12, further comprising:
determining that a pressure of the drilling fluid in the piping satisfies the target pressure parameter; and
closing the pressure relief device in response to determining that the pressure of the drilling fluid in the piping satisfies the target pressure parameter.

16. The method of claim 12, further comprising, in response to determining that the target pressure parameter is not satisfied, transmitting a notification signal to a notification system.

17. The method of claim 16, wherein the notification system includes an alarm that produces a sound upon receiving the notification signal.

18. The method of claim 12, wherein the piping includes a drilling rig standpipe connected to a Kelly or top drive system attached to the inlet of the drill string.

19. The method of claim 12, wherein the pressure of the drilling fluid in the piping is measured near a downhole end of the drill string.

20. A non-transitory computer-readable medium storing instructions executable by a processor to perform operations comprising:
determining, from a pressure of a drilling fluid in a drilling rig piping included in a drilling fluid circulation system and a flow of the drilling fluid, that a target pressure parameter of the drilling fluid in the drilling rig piping has been exceeded; and
in response to determining that the target pressure parameter of the drilling fluid has been exceeded, partially opening a pressure relief device comprising a diverter valve connected to the drilling fluid circulation system, wherein the target pressure parameter is a rate of increase in pressure of the drilling fluid in the piping, and wherein determining that the rate of increase of the drilling fluid has been exceeded comprises, and further wherein the diverter valve is sized to decrease the pressure of the drilling fluid in the piping by at least 30% by diverting at least a portion of the drilling fluid out of the piping:
determining an effective rate of increase in pressure of the drilling fluid in the drilling rig piping; and
determining that the effective rate of increase in pressure is greater than the rate of increase in pressure.

* * * * *